(12) United States Patent
Zhao et al.

(10) Patent No.: US 10,646,940 B2
(45) Date of Patent: May 12, 2020

(54) MACHINING METHOD FOR THREE-DIMENSIONAL OPEN FLOW CHANNEL USING HIGH-SPEED ARC DISCHARGE LAYERED SWEEP

(71) Applicant: Shanghai Jiao Tong University, Shanghai (CN)

(72) Inventors: Wansheng Zhao, Shanghai (CN); Lin Gu, Shanghai (CN); Jipeng Chen, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 312 days.

(21) Appl. No.: 15/714,104

(22) Filed: Sep. 25, 2017

(65) Prior Publication Data
US 2018/0104756 A1    Apr. 19, 2018

Related U.S. Application Data

(63) Continuation of application No. PCT/CN2016/076654, filed on Mar. 17, 2016.

(30) Foreign Application Priority Data

Apr. 9, 2015 (CN) .......................... 2015 1 0167085

(51) Int. Cl.
*B23H 9/14* (2006.01)
*B23H 1/02* (2006.01)
(Continued)

(52) U.S. Cl.
CPC ................. *B23H 9/14* (2013.01); *B23H 1/02* (2013.01); *B23H 1/022* (2013.01); *B23H 1/04* (2013.01);
(Continued)

(58) Field of Classification Search
CPC . B23H 9/14; B23H 7/265; B23H 7/26; B23H 7/28; B23H 7/30
See application file for complete search history.

(56) References Cited

U.S. PATENT DOCUMENTS 2,938,104 A * 5/1960 Paillarse ................. B23F 21/28
219/69.2
3,390,247 A * 6/1968 Webb ....................... B23H 1/00
219/69.14
(Continued)

FOREIGN PATENT DOCUMENTS

CN         101693310 A      4/2010
CN         102091839 B      8/2012
(Continued)

OTHER PUBLICATIONS

Wang, Fu-Yuan et al., "Process and key technologies of NC electrochemical machining of integral impeller via fractional-step method," Journal of South China University of Technology (Natural Science Edition), 38(8), 2010: 72-77 (Aug. 2010).

*Primary Examiner* — Geoffrey S Evans
(74) *Attorney, Agent, or Firm* — Mei & Mark LLP; Manni Li

(57) ABSTRACT

A machining method for three-dimensional open flow channel using high-speed arc discharge layered sweep, which arranges an axial line of an installation shaft of a tool electrode with six degrees of freedom to be perpendicular to an axial line of a to-be machined work piece in an arc discharge process, with the tool electrode sweeping in a closed path in a plane or a curved surface perpendicular to the installation shaft, wherein the path of the sweeping satisfies: a space of an enveloped space being formed by the tool electrode moving in the path and being coincident with a removed portion of the work piece does not exceed a preset machined cavity of the flow channel. The present invention is based on high-speed arc discharge of hydrodynamic arc breaking and realized layered milling and surface machining for three-dimensional open flow channels.

7 Claims, 3 Drawing Sheets

(51) Int. Cl.
*B23H 1/04* (2006.01)
*B23H 9/10* (2006.01)
*B23H 7/26* (2006.01)
*G05B 19/416* (2006.01)

(52) U.S. Cl.
CPC ............... *B23H 7/265* (2013.01); *B23H 9/10* (2013.01); *G05B 19/416* (2013.01)

(56) References Cited

U.S. PATENT DOCUMENTS

| | | | | |
|---|---|---|---|---|
| 4,057,703 | A * | 11/1977 | Pfau | B23H 7/28 219/69.13 |
| 4,310,742 | A * | 1/1982 | Pfau | B23H 7/28 219/69.16 |
| 5,972,209 | A * | 10/1999 | Shih | B01D 17/0214 210/104 |
| 6,401,006 | B1 | 6/2002 | Mizuno et al. | |
| 2002/0162824 | A1* | 11/2002 | Tricarico | B23H 7/20 219/69.17 |
| 2005/0247569 | A1* | 11/2005 | Lamphere | B23H 1/022 205/663 |
| 2007/0256939 | A1* | 11/2007 | Wei | B23H 1/022 205/674 |
| 2010/0140226 | A1* | 6/2010 | Sheu | B23H 1/022 219/69.13 |

FOREIGN PATENT DOCUMENTS

| | | |
|---|---|---|
| CN | 103934528 A | 7/2014 |
| CN | 104084654 A | 10/2014 |
| CN | 104117741 A | 10/2014 |

* cited by examiner

MACHINING METHOD FOR THREE-DIMENSIONAL OPEN FLOW CHANNEL USING HIGH-SPEED ARC DISCHARGE LAYERED SWEEP

CROSS-REFERENCE TO RELATED APPLICATIONS

The subject application is a continuation of PCT/CN2016/076654 filed on Mar. 17, 2016, which claims priority on Chinese Patent Application No. 201510167085.7 filed on Apr. 9, 2015 in China. Both PCT international application and Chinese priority application are incorporated herein by reference.

FIELD OF INVENTION

The present invention relates to metal machining, particularly, a high-speed arc discharge layered sweep machining method for three-dimensional open flow channels with complex geometry.

BACKGROUND ART

A three-dimensional channel is widely found in key components of engines, steam turbines, centrifugal pumps, compressors, and similar power equipments such as impellers and turbochargers. Common machining methods for three-dimensional open channels include mechanical cutting, electrical discharge machining, and electrochemical machining.

A mechanical cutting method mills material by means of multi-pass flank milling, plunge milling, or turning and milling compound machining with end mills in accordance with characteristics of the flow channels. Mechanical cutting achieves comparatively good machining efficiency for low hardness material. However, it causes low efficiency and serious tool wear for flow channel machining for difficult-to-mill material, and in some case, normal milling is out of question for three-dimensional flow channels with complex geometry due to interference. Electrical discharge machining is apt to achieve comparatively good surface quality and accuracy, but it has the down side of limited efficiency, which is a major issue for electrical discharge machining of three-dimensional flow channels.

Efficiency is also an issue for electrochemical machining. See, "A step-wise digitally controlled electrochemical machining process for an impeller and key techniques therefor," Journal of South China University of Technology (Natural Science Edition), 38(8), 2010: 71-77. The reference discloses an electrochemical machining method with a direct current voltage of 12V, 20% of $NaNO_3$ as electrolyte, working pressure of 0.8 MPa, and feed rate of 2 mm/min. As seen from the processing parameters, the electrochemical machining method involves a slow electrolysis process, has low feed rate, and creates heavy metals and other toxic waste, thus, requires complex subsequent purification treatment.

To improve the efficiency for three-dimensional open flow channel machining, high-speed arc discharge machining may be used. High-speed arc discharge machining, as compared with traditional electrical discharge machining, has a higher energy density and a far higher material removal rate per unit time. Chinese Patent ZL201110030724.7 discloses a cluster electrode high-speed arc discharge machining method in the field of electric arc discharge machining, featuring a peak current of 635 A, suitable flushing pressure, and pulse parameters for machining of titanium alloy, with a material removal rate of 6844 $mm^3$/mm.

Although employment of high-speed arc discharge machining attains several times higher machining efficiency, for three-dimensional open flow channels, short circuit due to poor chip removal is prone to take place and hampers normal machining operation, whether cluster electrode or other types of electrodes be employed. Further, inability of flushing holes on the tool electrode to discharge electricity results in residual bulges on the machined spots of the work-piece. Moreover, prior art three-dimensional flow channel machining proceeds in a point-wise manner, not conducive for optimization of machining efficiency.

SUMMARY OF THE INVENTION

The present invention solves the problems of the existing technology by providing a three-dimensional open flow channel high-speed arc discharge layered sweep machining method based on high-speed arc discharge in hydrodynamic arc breaking, for realization of highly efficient layered machining of three-dimensional open flow channels, and thus, eliminating post-machining residual bulges due to holes on the electrode.

The present invention provides a three-dimensional open flow channel high-speed arc discharge layered sweep machining method, by means of arranging an axial line of an installation shaft of a tool electrode with six degrees of freedom to be perpendicular to an axial line of a to-be machined work piece having multiple flow channels in an arc discharge process, with the tool electrode sweeping in a closed path in a plane or a curved surface perpendicular to the installation shaft.

In the present invention, the six degrees of freedom refers to linear movements along respective XYZ directions of a coordinate system and rotational ABC movements respectively around the XYZ axes.

In the present invention, the perpendicular arrangement refers to that the installation axes are mutually perpendicular.

In the present invention, the path of the sweeping satisfies that, subject to the respective prescriptions for the flow channel characteristics of the to-be machined work piece, the geometric shapes of the tool electrode, and the machining allowance, a space of an enveloped space being formed by the tool electrode moving in the path and being coincident with the work piece does not exceed a scheduled to be machined cavity of the flow channels.

Further, in case the to-be machined flow channels are of curved surface or have circular bottom surfaces, the tool electrode, in addition to being set to a sweeping movement along one freedom, is set to feed drive around the two other freedoms. More specifically, (a) in case the to-be machined flow channel along the X installation axis of the to-be machined work piece is of curved surface, the tool electrode along the Z installation axis is set to feed drive around the C axis in addition to being set to a sweeping movement, for realization of coordinated machining of the curved surface; and (b) in case the to-be machined flow channel along the X installation axis of the to-be machined work piece has a circular bottom surface, the tool electrode along the Z installation axis is set to feed drive around the B axis in addition to being set to a sweeping movement for realization of coordinated machining of the circular bottom surface.

In either of the above processes, the broken down working fluid forms a discharging arc for material removal.

The method of the present invention comprises the following steps:

step one, respectively disposing the work piece and the tool electrode on a rotary table and a main shaft of the machine tool, with the axial line of the installation axis of the tool electrode being perpendicular to the axial line of the work piece; in the mean time, forming a flushing circuit in the water-based working fluid in a water tank via flushing holes on the tool electrode and a water trough in the water tank, the flushing holes being on a bottom surface of the tool electrode, that is, on a side perpendicularly facing the axial line of the work piece;

step two, respectively connecting the work piece and the tool electrode to two poles of a power source, thus the work piece and the tool electrode forming a discharging circuit in the water-based working fluid;

step three, feed driving the tool electrode along the X, Y, and Z directions, and subsequently sweeping the tool electrode in small movement in a closed path along a plane or curved surface perpendicular to the axial line of the installation axis of the tool electrode, for removing residual bulges on the work piece and for realizing surface machining of the three-dimensional open flow channels.

In accordance with the characteristics of the to-be machined flow channels, the tool electrode may turn around the C axis for coordinated machining of curved surfaces, wherein the water-based working fluid is broken down to form a discharging arc for material removal.

step four, subsequent to layered sweep machining of multiple layers of a single flow channel, moving the work piece in a divisional arrangement around the A axis for a next to-be machined flow channel position, repeating the discharging process until all the flow channels have been machined.

In comparison with the prior art, the present invention provides a layered sweep machining method for three-dimensional open flow channels by means of introducing high-speed arc discharging, and provides the following advantages:

(1) increased machining efficiency for three-dimensional open flow channels and material removal rate;

(2) increased material removal rate by means of substitution of surface machining for prior art point-wise machining;

(3) enhanced stability in the machining process, that is, good arc breaking property and prevention of work piece ablation; and (4) increased effectiveness of chip removal, and decreased possibility of short circuit owing to more convenient chip removal.

More specifically, high-speed arc discharge layered sweep increases machining efficiency and effectively removes residual bulges in the work piece. In the mean time, hydrodynamic arc breaking with water-based working fluid as a discharge medium for flushing in-between the tool electrode and in combination with pulsed electrical arc breaking effectively increases machining stability and decreases the possibility of work piece ablation. Further, curved path layered sweep movement creates sufficient chip removal space, thus improves the short circuit issue due to poor chip removal (even inability of chip removal).

Reference numbers in the figures are used as follows: 1-water tank, 2-machine tool, 3-water trough, 4-tool electrode, 5-power source, 6-work piece, and 7-rotary table.

DETAILED DESCRIPTION OF INVENTION AND EMBODIMENT

In combination with the figures, the present invention is explained in the following embodiment with detailed means and procedures, which is to implement the technical solution of the present invention but is not meant to limit the scope of protection of the present invention.

Figure 1:
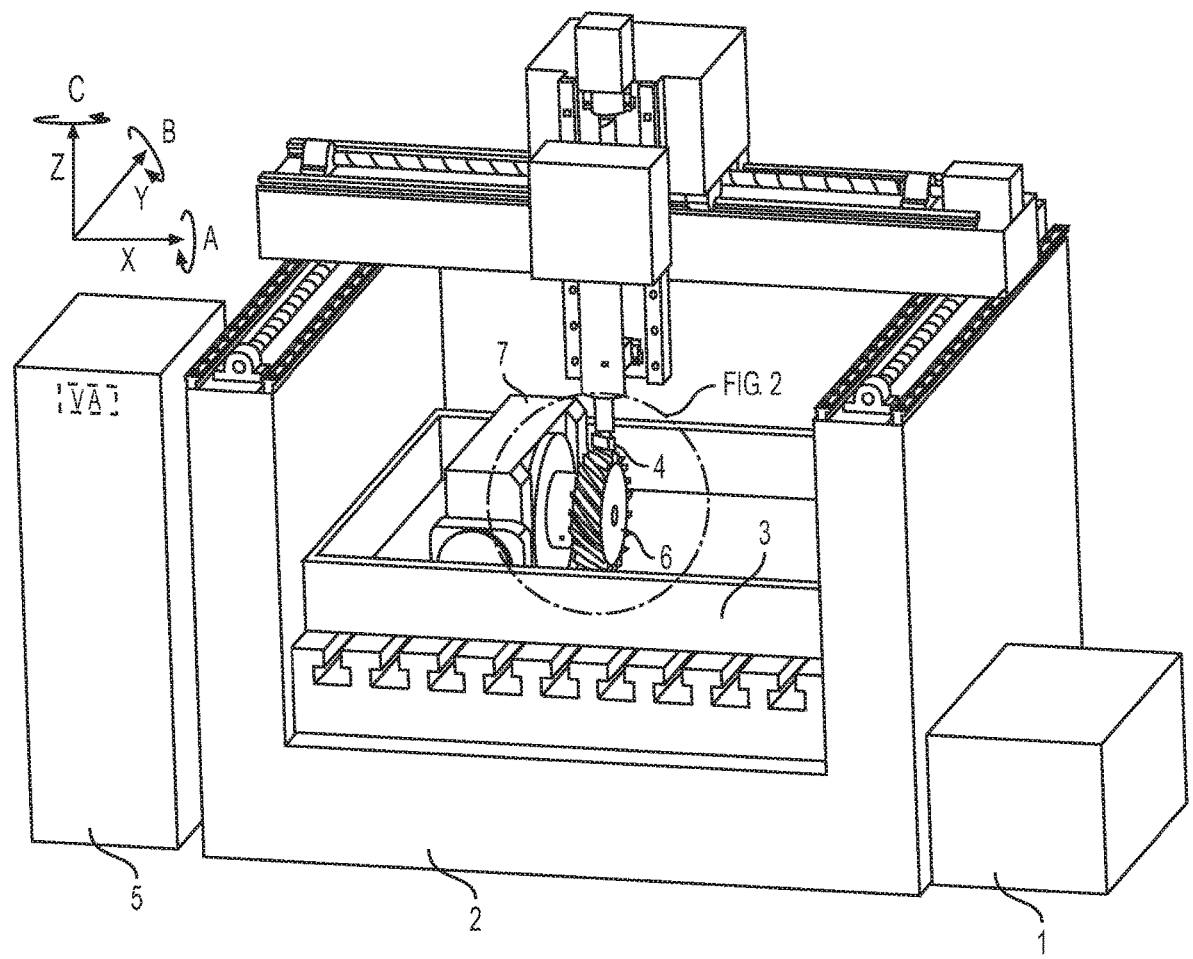
FIG. 1 is a schematic three-dimensional diagram of an embodiment of the present invention.

As is shown in FIG. 1, the milieu of application for the embodiment of the present invention comprises a tool electrode 4 disposed on a tool machine 2, a rotary table 7 for fixing a work piece 6, a water trough 3 underneath the work piece 6, a water tank 1 connected with the water trough 3, and a power source connected with the tool electrode 4.

The power source 5 features a peak current of 50 A-3000 A direct current power source, with a pulse width of 0.002 ms-10 ms and a pulse interval of 0-10 ms.

The embodiment of the method of the present invention comprises the following steps:

step one, respectively disposing the work piece 6 and the tool electrode 4 on the rotary table 7 and a main shaft of the machine tool 2, with an axial line of an installation axis of the tool electrode 4 being perpendicular to an axial line of the work piece 6; in the mean time, forming a flushing circuit in a water-based working fluid in the water tank 1 via flushing holes on the tool electrode 4 and the water trough 3 in the water tank 1, the flushing holes being on a bottom surface of the tool electrode 4, that is, on a side perpendicularly facing the axial line of the work piece 6;

step two, respectively connecting the work piece 6 and the tool electrode 4 to two poles of the power source 5, thus the work piece 6 and the tool electrode 4 forming a discharging circuit in the water-based working fluid;

step three, feed driving the tool electrode 4 along the X, Y, and Z directions, and subsequently sweeping the tool electrode 4 in small movement in a closed path along a plane or curved surface perpendicular to the axial line of the installation axis of the tool electrode 4, for removing residual bulges on the work piece 6 and for realizing surface machining of the three-dimensional open flow channels;

step four, revolving the tool electrode 4 around the C axis for realization of coordinated machining of a curved surface, or alternatively swinging the work piece 6 around the B axis for realization of coordinated machining of a circular bottom surface; in the current process, the water-based working fluid is broken down to form an electric arc for material removal;

step five, conducting layered sweep machining of multiple layers of a single flow channel, moving the work piece 6 in a divisional arrangement around the A axis for a next to-be machined flow channel position, repeating the discharging process until all the flow channels have been machined.

The flushing circuit refers to the water-based working fluid in-between the tool electrode 4 and the work piece 6 flows above a pressure of 0.1 MPa.

The closed path with small movement is obtained in accordance with the flow characteristics of the work piece 6, the geometric shapes of the tool electrode 4, and the machining allowance thereof, and by means of a path planning scheme, with the criterion thereof being as follows: the space of the enveloped space being formed by the tool electrode 4 moving in accordance with the above movement rule and being coincident with a removed portion of the work piece 6 does not exceed a scheduled to be machined cavity of the flow channel.

Figure 2:
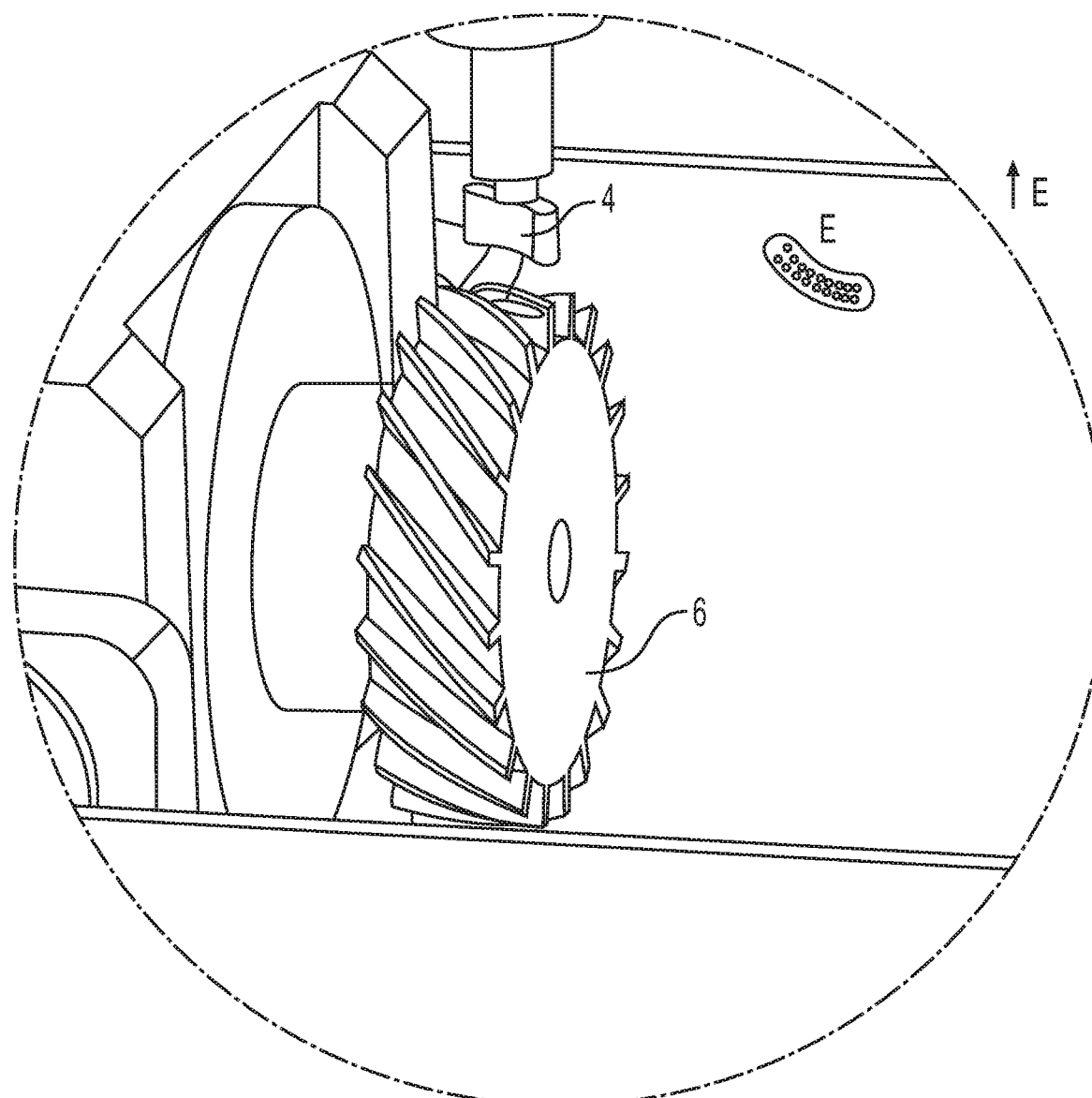
FIG. 2 is a partial enlargement of FIG. 1 showing the embodiment of the present invention.
Figure 3:
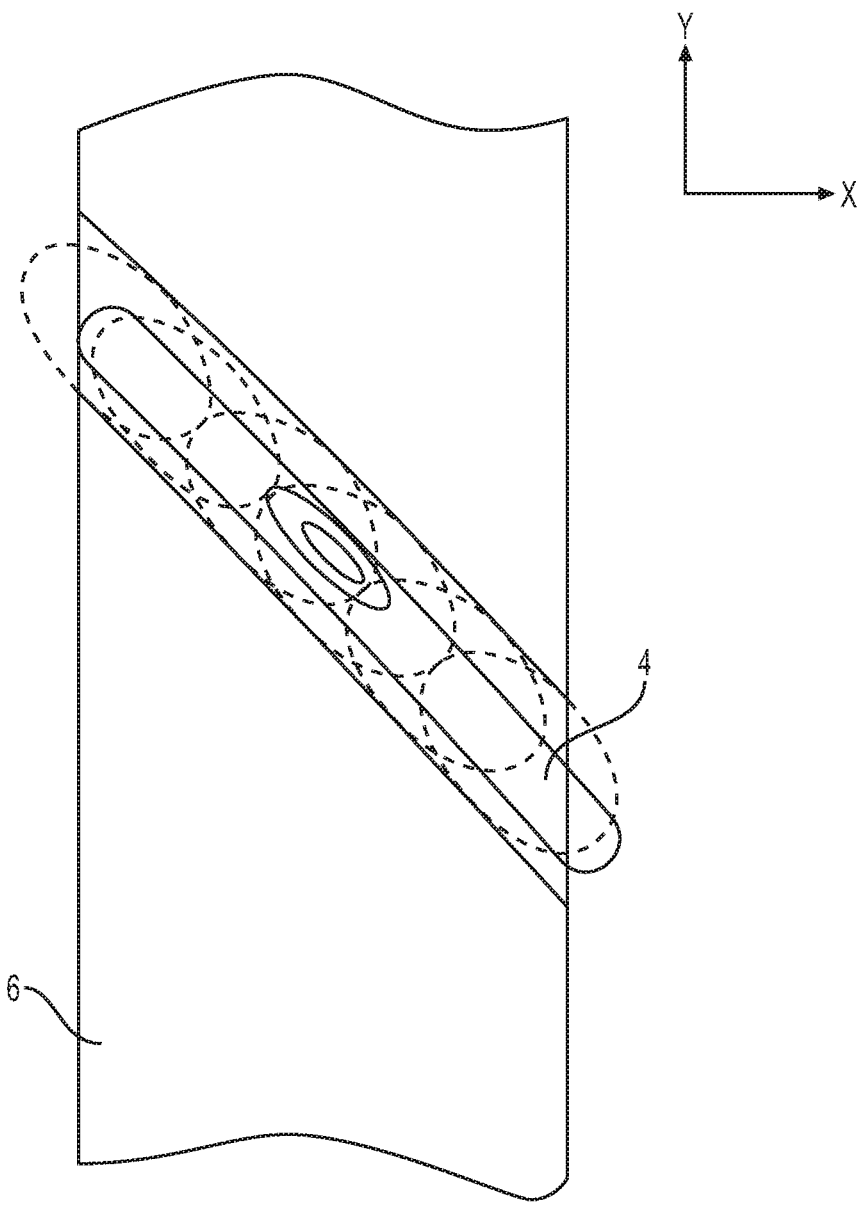
FIG. 3 shows the working principle for the present invention.

The three-dimensional open flow channel high-speed arc discharge layered sweep machining method is further exemplified in FIGS. 2 and 3 with the principle being further exemplified as follows:

The tool electrode 4 feed drives along the X, Y, or Z direction, with electric discharging concentrated on the bottom of the tool electrode 4, and with chips formed due to the electric discharging carried off by the fluid on the bottom of the tool electrode 4; further, in order to remove residual bulges on the work piece 6 due to no discharging in the flushing holes on the tool electrode 4, the tool electrode 4 sweeps in small movement in a path $\varphi(x, y, z)$ perpendicular to a plane or curved surface of the installation axis thereof; in the process, the tool electrode 4 feed drives around the C axis for realization of coordinated machining of a curved surface, in case the machined flow channel is of curved surface; or alternatively, the work piece 6 feed drives around the B axis for realization of coordinated machining of a circular bottom surface, in case the machined flow channel is of circular bottom surface.

In the above movement, the enveloped space $V(x, y, z)$ formed by the tool electrode 4 is smaller than and close to the scheduled to be machined cavity size, and no overcutting or interference will take place. Subsequent to layered sweep machining of multiple layers of a single flow channel, the work piece 6, driven by the rotary table 7, moves in a divisional arrangement around the A axis for a next to-be machined flow channel position, with the discharging process being repeated until all the flow channels have been machined. Layered milling is realized with the introduction of layered sweeping in the feed driving process of the tool electrode 4 for removing residual bulges on the work piece 6, for enlarging chip removing space, so that flushing efficiency is increased, corroded particles are carried off, and smooth machining is guaranteed with high efficiency.

We claim:

1. A machining method for a three-dimensional open flow channel using high-speed arc discharge layered sweep, comprising
    providing a tool electrode comprising an installation shaft with an axial line and a plurality of flushing holes at bottom surface of the tool electrode, wherein the tool electrode moves in six degrees of freedom comprising linear movement in X, Y, and Z directions and rotational movement in A, B, and C axes around the X, Y, Z directions, respectively,
    disposing the tool electrode on a main shaft of a machine tool and a work piece comprising an axial line on a rotary table of the machine tool,
    arranging the axial line of the installation shaft of the tool electrode to be perpendicular to the axial line of the work piece, wherein the flushing holes at the bottom surface of the tool electrode are on a side perpendicular facing the axial line of the work piece,
    forming a flushing circuit in a water-based working fluid in a water tank by the flushing holes at the bottom surface of the tool electrode and a water trough in the water tank,
    respectively connecting the work piece and the tool electrode to two poles of a power source to form a discharging circuit in the water-based working fluid, wherein the water-base working fluid between the work piece and the tool electrode is a discharging medium that breaks down to form a discharging arc for material removal and surface machining of a three-dimensional open flow channel, and hydrodynamic arc breaking by the water-based working fluid as the discharging medium for flushing between the tool electrode and the work piece combines with pulsed electrical arc breaking,
    feed driving the tool electrode along the X, Y, Z directions, and subsequently sweeping in small movement in a closed path in a plane or a curved surface perpendicular to the axial line of the installation shaft of the tool electrode, wherein the path of sweeping satisfies that moving the tool electrode in the path of sweeping and being coincident with removal of portion of the work piece forms an enveloped space that does not exceed a preset size of the machined cavity of the flow channel, and
    performing layered sweeping machining of multiple layers of a single flow channel to form the three-dimensional open flow channel.

2. The method of claim 1, wherein the three-dimensional open flow channel in the work piece is of curved surface or have circular bottom surfaces, and the tool electrode, in addition to being set to a sweeping movement along one freedom, is set to feed drive around the two other freedoms.

3. The method of claim 1, wherein the three-dimensional open flow channel of the work piece along an X installation axis of the work piece is of a curved surface, and the tool electrode along a Z installation axis is set to feed drive around a C axis in addition to being set to a sweeping movement, for realization of coordinated machining of the curved surface.

4. The method of claim 1, wherein the three-dimensional open flow channel of the work piece along an X installation axis of the work piece is of a circular bottom surface, and the tool electrode along the Z installation axis is set to feed drive around a B axis in addition to being set to a sweeping movement, for realization of coordinated machining of the circular bottom surface.

5. The method of claim 1, further comprising
    moving the work piece in a divisional arrangement around the A axis for a next to-be machined flow channel position, and
    repeating discharging process until all three-dimensional open flow channels are machined.

6. The method of claim 1, wherein the power source is a direct current power source having a peak current of 50 A to 300 A, a pulse width of 0.002 ms to 10 ms, and a pulse interval of 0 to 10 ms.

7. The method of claim 1, wherein the flushing circuit is the water-based working fluid in-between the tool electrode and the work piece flows above a pressure of 0.1 MPa.

* * * * *